US011593996B2

(12) United States Patent
Cower et al.

(10) Patent No.: US 11,593,996 B2
(45) Date of Patent: Feb. 28, 2023

(54) SYNTHESIZING THREE-DIMENSIONAL VISUALIZATIONS FROM PERSPECTIVES OF ONBOARD SENSORS OF AUTONOMOUS VEHICLES

(71) Applicant: Waymo LLC, Mountain View, CA (US)

(72) Inventors: Dillon Cower, Woodinville, WA (US); Nirmal Patel, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 17/171,221

(22) Filed: Feb. 9, 2021

(65) Prior Publication Data

US 2022/0254108 A1  Aug. 11, 2022

(51) Int. Cl.
*G06T 19/00* (2011.01)
*G06T 19/20* (2011.01)
*G06T 7/20* (2017.01)
*G06T 15/20* (2011.01)

(52) U.S. Cl.
CPC .............. *G06T 19/006* (2013.01); *G06T 7/20* (2013.01); *G06T 15/20* (2013.01); *G06T 19/20* (2013.01); *G06T 2207/10028* (2013.01); *G06T 2207/30241* (2013.01); *G06T 2207/30252* (2013.01); *G06T 2219/2016* (2013.01)

(58) Field of Classification Search
CPC combination set(s) only.
See application file for complete search history.

(56) References Cited

U.S. PATENT DOCUMENTS

| | | | | |
|---|---|---|---|---|
| 10,282,915 | B1* | 5/2019 | Lin | G06T 17/00 |
| 11,308,632 | B2* | 4/2022 | Wang | G06T 7/55 |
| 11,321,862 | B2* | 5/2022 | Guizilini | G06T 7/30 |
| 11,321,864 | B1* | 5/2022 | El Dokor | G06T 7/60 |
| 2018/0225875 | A1 | 8/2018 | Yasrebi | |
| 2019/0122386 | A1 | 4/2019 | Wheeler et al. | |
| 2020/0018852 | A1 | 1/2020 | Walls et al. | |
| 2020/0098164 | A1 | 3/2020 | Bruns et al. | |
| 2020/0195846 | A1 | 6/2020 | Appia et al. | |
| 2020/0280678 | A1 | 9/2020 | Hariyani et al. | |

(Continued)

OTHER PUBLICATIONS

Cui, Zhichao, et al. "Multi-model traffic scene simulation with road image sequences and GIS information." 2018 IEEE Intelligent Vehicles Symposium (IV). IEEE, 2018. (Year: 2018).*

(Continued)

*Primary Examiner* — Ryan M Gray
(74) *Attorney, Agent, or Firm* — Botos Churchill IP Law

(57) ABSTRACT

Aspects of the disclosure provide for generating a visualization of a three-dimensional (3D) world view from the perspective of a camera of a vehicle. For example, images of a scene captured by a camera of the vehicle and 3D content for the scene may be received. A virtual camera model for the camera of the vehicle may be identified. A set of matrices may be generated using the virtual camera model. The set of matrices may be applied to the 3D content to create a 3D world view. The visualization may be generated using the 3D world view as an overlay with the image, and the visualization provides a real-world image from the perspective of the camera of the vehicle with one or more graphical overlays of the 3D content.

23 Claims, 8 Drawing Sheets

(56) References Cited

U.S. PATENT DOCUMENTS

| | | | | |
|---|---|---|---|---|
| 2020/0284913 A1* | 9/2020 | Amelot | ................ | G01S 17/894 |
| 2020/0334861 A1 | 10/2020 | Jin et al. | | |
| 2021/0004566 A1 | 1/2021 | Qi et al. | | |
| 2021/0158079 A1* | 5/2021 | Aliamiri | ................ | G06V 10/82 |
| 2021/0342600 A1* | 11/2021 | Westmacott | ........... | G06V 20/56 |
| 2021/0407130 A1* | 12/2021 | Qian | ................ | G01S 17/931 |
| 2022/0124283 A1* | 4/2022 | Krol | ................ | G06Q 30/0277 |
| 2022/0132049 A1* | 4/2022 | Tamura | ................ | G06V 20/56 |

OTHER PUBLICATIONS

Fremont, Vincent, and Philippe Bonnifait. "Extrinsic calibration between a multi-layer lidar and a camera." 2008 IEEE International Conference on Multisensor Fusion and Integration for Intelligent Systems. IEEE, 2008. (Year: 2008).*

MDN Web Docs, WebGL model view projections, https://developer.mozilla.org/en-US/docs/Web/API/WebGL_API/WebGL_model_view_projection, last modified Jan. 11, 2021, pp. 1-23.

Wikipedia Change of basis, retrieved from https://en.wikipedia.org/wiki/Change_of_basis, pp. 1-6, 2021.

Wikipedia Transformation Matrix, Retrieved from https://en.wikipedia.org/wiki/Transformation_matrix, pp. 1-9, 2021.

Simke, Kyle, Calibrated Cameras in OpenGL without glFrustum, Sightations—A Computer Vision Blog, http://ksimek.github.io/2013/06/03/calibrated_cameras_in_opengl/, 2013, pp. 1-10.

International Search Report and The Written Opinion for International Application No. PCT/US2022/015071, dated May 18, 2022, 9 Pages.

* cited by examiner

SYNTHESIZING THREE-DIMENSIONAL VISUALIZATIONS FROM PERSPECTIVES OF ONBOARD SENSORS OF AUTONOMOUS VEHICLES

BACKGROUND

Autonomous vehicles, for instance, vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location. Autonomous vehicles are equipped with various types of sensors in order to detect objects in the surroundings. For example, autonomous vehicles may include sonar, radar, camera, LIDAR, and other devices that scan and record data from the vehicle's surroundings.

BRIEF SUMMARY

Aspects of the disclosure provide a method of generating a visualization of a three-dimensional (3D) world view from a perspective of a camera of a vehicle. The method includes receiving, by one or more processors, images of a scene captured by the camera of the vehicle and 3D content for the scene; identifying, by the one or more processors, a virtual camera model for the camera; generating, by the one or more processors, a set of matrices using the virtual camera model; applying, by the one or more processors, the set of matrices to the 3D content to create the 3D world view; and generating the visualization, by the one or more processors, using the 3D world view as an overlay with the image, wherein the visualization provides a real-world image from the perspective of the camera of the vehicle with one or more graphical overlays of the 3D content.

In on example, the virtual camera model is identified based on intrinsic and extrinsic parameters of the camera. In this example, the parameters include focal length, aperture size, position and rotation of the camera relative to the vehicle when the images were captured. In another example, the set of matrices includes a view matrix. In this example, the view matrix transforms from world-space coordinates into camera-space coordinates. In addition or alternatively, applying the set of matrices includes generating coordinates for the 3D content in a reference frame of the camera. In addition or alternatively, the view matrix is defined as a combination of a swap matrix, a camera extrinsics matrix, and a vehicle pose matrix. In this example, the swap matrix is configured to perform a coordinate swap to transform from vehicle coordinates to 3D rendering coordinates. In addition or alternatively, the camera extrinsics matrix provides a 3D position and 3D rotation of the camera when an image of the images was captured. In addition or alternatively, the vehicle pose matrix provides rotation and position of the vehicle when an image of the images was captured.

In another example, the set of matrices includes a projection matrix. In this example, the projection matrix is configured to transform 3D coordinates in a reference frame of the camera into clip-space coordinates. In addition or alternatively, the projection matrix is defined as a combination of a transformation matrix and an orthographic projection matrix. In this example, the transformation matrix is configured to generate projected coordinates using a linear transformation of 3D content and distorting points from a perspective of the camera. In addition, the orthographic projection matrix is configured to convert the projected coordinates into clip space coordinates.

In another example, the 3D world view incorporates 3D content from space outside of the virtual camera model. In another example, the 3D content includes 3D bounding boxes for objects. In another example, the 3D content includes one or more of 3D LIDAR points, 3D LIDAR point clouds, or 3D surfel maps. In another example, the 3D content includes features of a roadgraph. In another example, the 3D content includes behavior prediction trajectories for objects.

DETAILED DESCRIPTION

Overview

Figure 1:
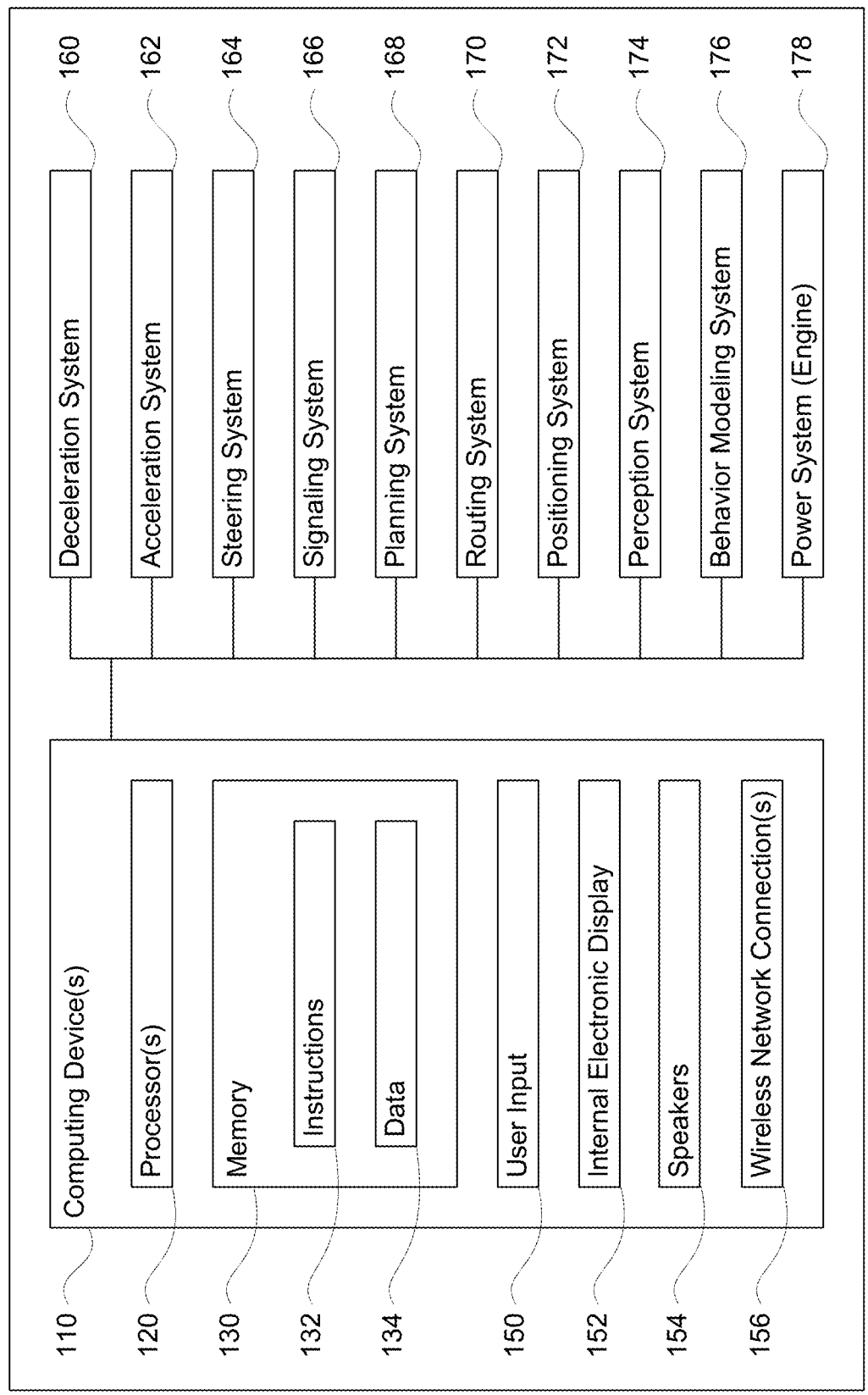
FIG. 1 is a functional diagram of an example vehicle in accordance with an exemplary embodiment.
Figure 2:
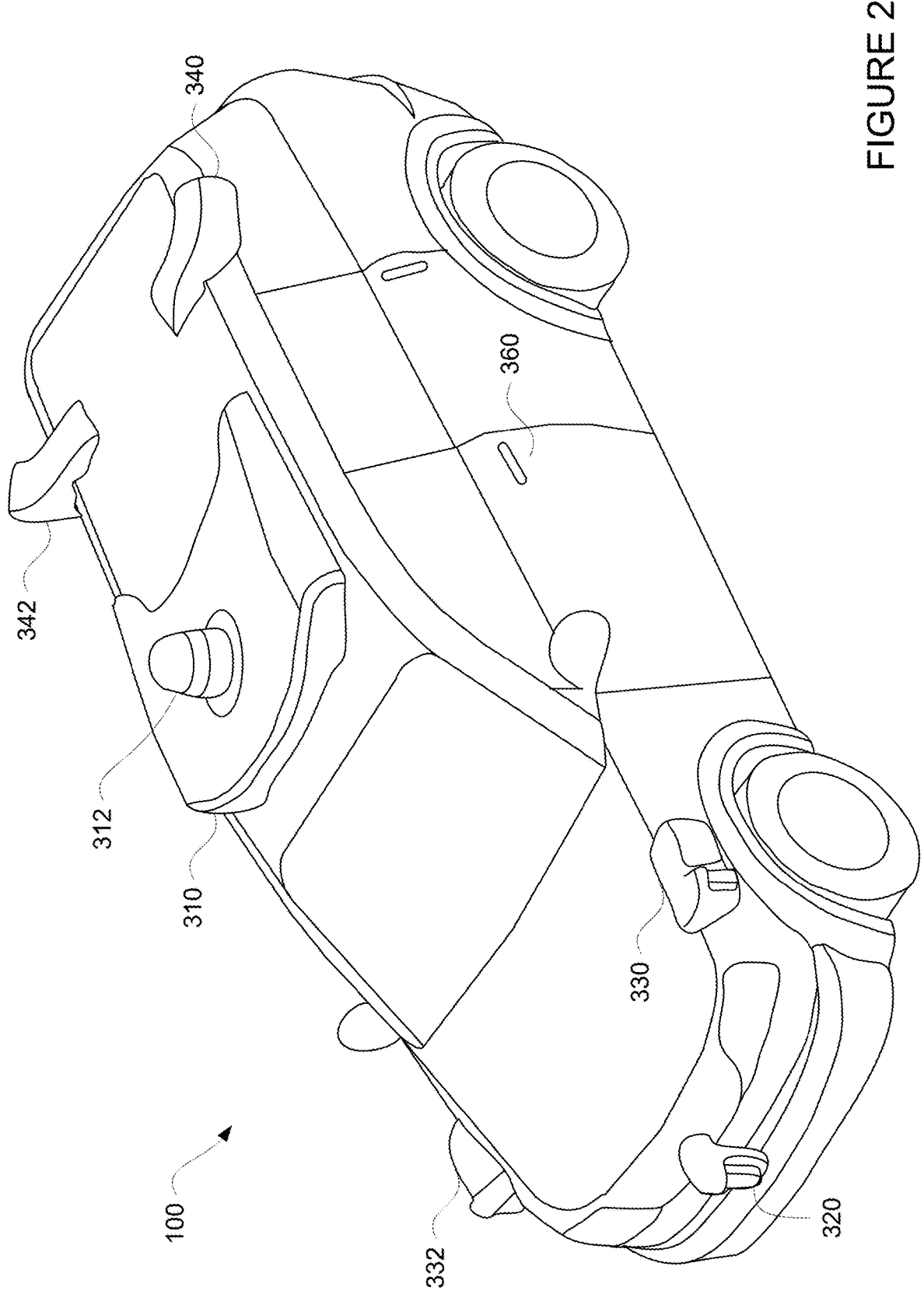
FIG. 2 is an example external view of a vehicle in accordance with aspects of the disclosure.

The technology relates to synthesizing three-dimensional (3D) visualization from perspectives of onboard sensors of autonomous vehicles. The perception systems of autonomous vehicles may include various different sensors including LIDAR sensors that generate 3D LIDAR data and cameras that generate two-dimensional (2D) images. The 3D LIDAR data may be processed to generate 3D content. This 3D content may be rendered from a perspective of a vehicle's onboard cameras using the intrinsic and extrinsic parameters of each camera as well as the vehicle's pose (position and orientation) in the word. In other words, the 3D content can be rendered on top of the camera images to provide an easy-to-understand mapping between the vehicle's 3D content and a real-world captured scene. Such renderings may enable engineers to visualize what the vehicle's computing devices are perceiving in each camera, compared to typical top-down 3D view or other perspective views of only small portions of the 3D content (e.g. individual objects or groups of sensor data) shown adjacent to camera images.

In order to generate the aforementioned renderings, a virtual camera model for each camera on a vehicle may be identified. The virtual camera model for a particular camera may identify the three-dimensional volume of space or the image space that that camera may capture. Each virtual model may describe the intrinsic and extrinsic parameters of the camera. Examples of intrinsic parameters may include focal length and aperture size, and examples of extrinsic parameter may include the position and rotation of the camera relative to the vehicle.

The model for each camera may be used to generate a set of matrices for that camera. As with the models, the matrixes may not be the same for each camera for each calibration, and thus may need to be redetermined if the cameras are recalibrated. The matrices may include a view matrix and a projection matrix. The view matrix and projection matrix may be applied to the 3D content.

The view matrix may be a matrix that transforms from world-space coordinates into camera-space coordinates. In this regard, the view matrix takes as input the coordinates of an object in the world, and as output provides the coordinates in the reference frame of a camera on the vehicle. The view matrix may be defined as a combination of a swap matrix, a camera extrinsics matrix, and a vehicle pose matrix.

The projection matrix may transform from 3D camera-space coordinates or rather coordinates in a reference frame of the camera into clip-space coordinates. During rendering, the projection matrix is used to transform all visible coordinates into normalized device coordinate space, and anything outside of that is discarded during rendering. The projection matrix may be defined as a combination of a perspective projective transformation matrix and an orthographic projection matrix.

The results of the application of the view matrix and the projection matrix for each camera may be a virtual camera space within a 3D world view for the scene. In other words, all of the 3D content captured in a scene may be incorporated into the virtual camera space for a camera even if it is outside of or beyond the 3D area of the virtual camera model. The 3D world view may then be composited with images captured by the camera to create a visualization of the 3D world view. In this regard, the visualization provides a real-world image from the perspective of the camera of the vehicle with one or more graphical overlays of the 3D content.

The aforementioned features may enable such operators to more readily identify certain issues, some of which may stem from improper sensor calibration. For instance, when viewing the 3D world view overlayed with the camera images, an operator is able to visualize the 3D view from a camera of the vehicle. In this regard, the operator is able to directly visualize what objects the vehicle is detecting. Moreover, because the aforementioned steps can be performed locally (e.g. there is only one copy of the 3D content is needed at the GPU), rather than remotely at a server computing device, creating the 3D world view and overlaying with the camera images may be very performance efficient. In addition, because the aforementioned steps can all be performed locally at a client computing device, a developer working on camera calibration or investigating camera calibration issues could interactively adjust the camera model (intrinsics/extrinsics) and view the results. This may be especially useful for debugging (e.g., poor/incorrect camera calibration.).

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 134 and data 132 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs or GPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., one or more button, mouse, keyboard, touch screen and/or microphone), various electronic displays (e.g., a monitor having a screen or any other electrical device that is operable to display information), and speakers 154 to provide information to a passenger of the vehicle 100 or others as needed. For example, electronic display 152 may be located within a cabin of vehicle 100 and may be used by computing devices 110 to provide information to passengers within the vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

The computing devices 110 may be part of an autonomous control system for the vehicle 100 and may be capable of communicating with various components of the vehicle in order to control the vehicle in an autonomous driving mode. For example, returning to FIG. 1, the computing devices 110 may be in communication with various systems of vehicle 100, such as deceleration system 160, acceleration system 162, steering system 164, signaling system 166, planning system 168, routing system 170, positioning system 172, perception system 174, behavior modeling system 176, and power system 178 in order to control the movement, speed, etc. of vehicle 100 in accordance with the instructions 134 of memory 130 in the autonomous driving mode.

As an example, the computing devices 110 may interact with deceleration system 160 and acceleration system 162 in order to control the speed of the vehicle. Similarly, steering system 164 may be used by computing devices 110 in order to control the direction of vehicle 100. For example, if vehicle 100 is configured for use on a road, such as a car or truck, the steering system may include components to control the angle of wheels to turn the vehicle. The computing devices 110 may also use the signaling system 166 in order to signal the vehicle's intent to other drivers or vehicles, for example, by lighting turn signals or brake lights when needed.

Routing system 170 may be used by the computing devices 110 in order to generate a route to a destination using map information. Planning system 168 may be used by computing device 110 in order to generate short-term trajectories that allow the vehicle to follow routes generated by the routing system. In this regard, the planning system 168 and/or routing system 166 may store detailed map information, e.g., highly detailed maps identifying a road network including the shape and elevation of roadways, lane lines, intersections, crosswalks, speed limits, traffic signals, buildings, signs, real time traffic information (updated as received from a remote computing device, as such as the computing devices 410 discussed below or other computing devices), pullover spots, vegetation, or other such objects and information.

In addition to the aforementioned physical feature information, the map information may be configured as a roadgraph which includes a plurality of graph nodes and edges representing road or lane segments that together make up the road network of the map information. Each edge is defined by a starting graph node having a specific geographic location (e.g. latitude, longitude, altitude, etc.), an ending graph node having a specific geographic location (e.g. latitude, longitude, altitude, etc.), and a direction. This direction may refer to a direction the vehicle 100 must be moving in in order to follow the edge (i.e. a direction of traffic flow). The graph nodes may be located at fixed or variable distances. For instance, the spacing of the graph nodes may range from a few centimeters to a few meters and may correspond to the speed limit of a road on which the graph node is located. In this regard, greater speeds may correspond to greater distances between graph nodes. The edges may represent driving along the same lane or changing lanes. Each node and edge may have a unique identifier, such as a latitude and longitude location of the node or starting and ending locations or nodes of an edge. In addition to nodes and edges, the map may identify additional information such as types of maneuvers required at different edges as well as which lanes are drivable.

The routing system 166 may use the aforementioned map information to determine a route from a current location (e.g. a location of a current node) to a destination. Routes may be generated using a cost-based analysis which attempts to select a route to the destination with the lowest cost. Costs may be assessed in any number of ways such as time to the destination, distance traveled (each edge may be associated with a cost to traverse that edge), types of maneuvers required, convenience to passengers or the vehicle, etc. Each route may include a list of a plurality of nodes and edges which the vehicle can use to reach the destination. Routes may be recomputed periodically as the vehicle travels to the destination.

The map information used for routing may be the same or a different map as that used for planning trajectories. For example, the map information used for planning routes not only requires information on individual lanes, but also the nature of lane boundaries (e.g., solid white, dash white, solid yellow, etc.) to determine where lane changes are allowed. However, unlike the map used for planning trajectories, the map information used for routing need not include other details such as the locations of crosswalks, traffic lights, stop signs, etc., though some of this information may be useful for routing purposes. For example, between a route with a large number of intersections with traffic controls (such as stop signs or traffic signal lights) versus one with no or very few traffic controls, the latter route may have a lower cost (e.g. because it is faster) and therefore be preferable.

Positioning system 170 may be used by computing devices 110 in order to determine the vehicle's relative or absolute position on a map or on the earth. For example, the positioning system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude, a location of a node or edge of the roadgraph as well as relative location information, such as location relative to other cars immediately around it which can often be determined with less noise that absolute geographical location.

The positioning system 172 may also include other devices in communication with the computing devices computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 174 also includes one or more components for detecting objects external to the vehicle such as other vehicles, obstacles in the roadway, traffic signals, signs, trees, etc. For example, the perception system 174 may include LIDARs, sonar, radar, cameras and/or any other detection devices that record data which may be processed by the computing devices of the computing devices 110. In the case where the vehicle is a passenger vehicle such as a minivan, the minivan may include a laser or other sensors mounted on the roof or other convenient location.

Figure 3:
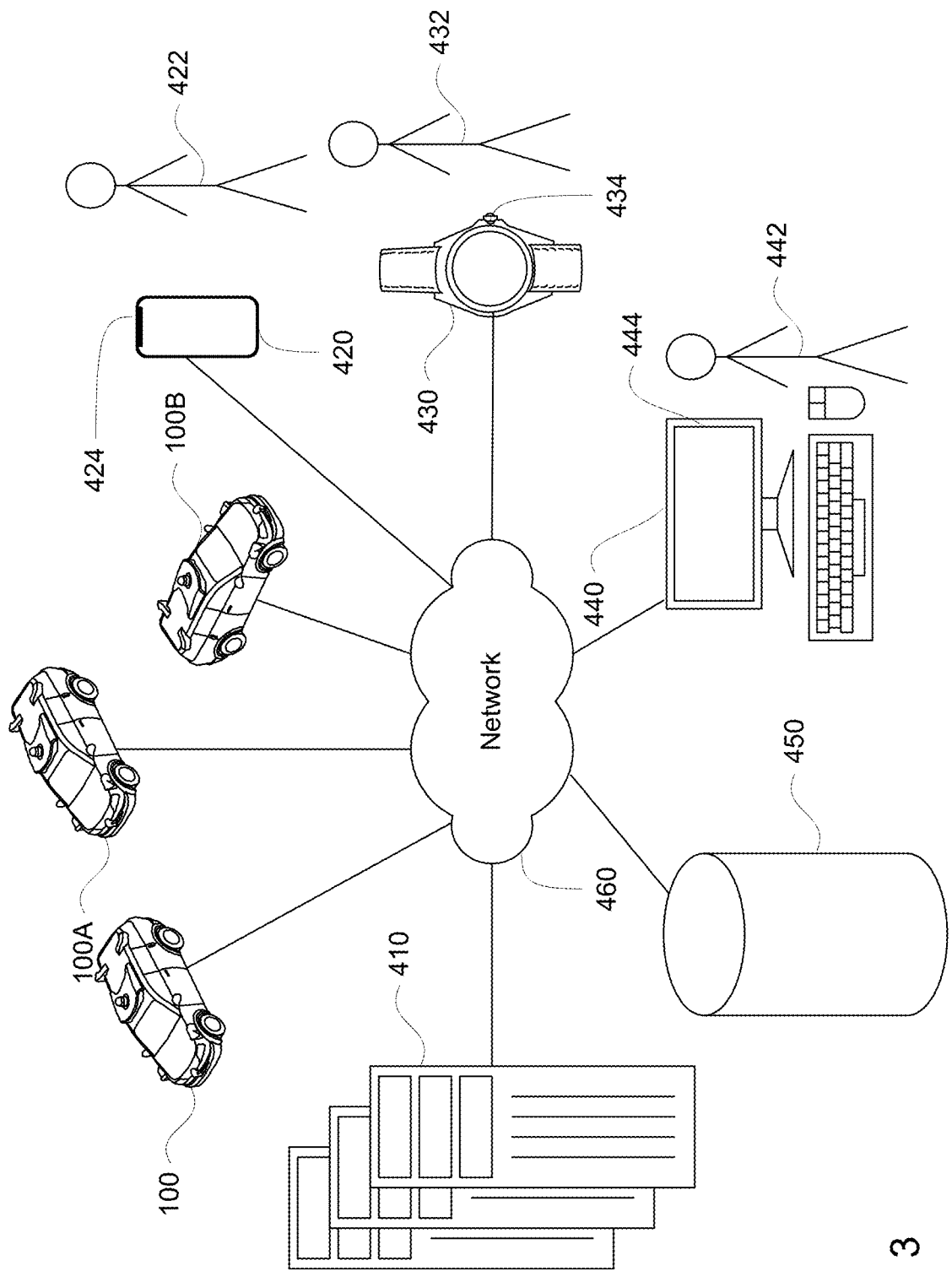
FIG. 3 is a pictorial diagram of an example system in accordance with aspects of the disclosure.

For instance, FIG. 3 is an example external view of vehicle 100. In this example, roof-top housing 310 and dome housing 312 may include a LIDAR sensor as well as various cameras and radar units. In addition, housing 320 located at the front end of vehicle 100 and housings 330, 332 on the driver's and passenger's sides of the vehicle may each store a LIDAR sensor. For example, housing 330 is located in front of driver door 360. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310.

The computing devices 110 may be capable of communicating with various components of the vehicle in order to control the movement of vehicle 100 according to primary vehicle control code of memory of the computing devices 110. For example, returning to FIG. 1, the computing devices 110 may include various computing devices in communication with various systems of vehicle 100, such as deceleration system 160, acceleration system 162, steering system 164, signaling system 166, planning system 168, routing system 170, positioning system 172, perception system 174, behavior modeling system 176, and power system 178 (i.e. the vehicle's engine or motor) in order to control the movement, speed, etc. of vehicle 100 in accordance with the instructions 134 of memory 130.

The various systems of the vehicle may function using autonomous vehicle control software in order to determine how to and to control the vehicle. As an example, a perception system software module of the perception system 174 may use sensor data generated by one or more sensors of an autonomous vehicle, such as cameras, LIDAR sensors, radar units, sonar units, etc., to detect and identify objects and their characteristics. These characteristics may include location, type, heading, orientation, speed, acceleration, change in acceleration, size, shape, etc. In some instances, characteristics may be input into a behavior prediction system software module of the behavior modeling system 176 which uses various behavior models based on object type to output a predicted future behavior for a detected object. In other instances, the characteristics may be put into one or more detection system software modules, such as a traffic light detection system software module configured to detect the states of known traffic signals, construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may use various models to output a likelihood of a construction zone or an object being an emergency vehicle. Detected objects, predicted future behaviors, various likelihoods from detection system software modules, the map information identifying the vehicle's environment, position information from the positioning system 170 identifying the location and orientation of the vehicle, a destination location or node for the vehicle as well as feedback from various other systems of the vehicle may be input into a planning system software module of the planning system 168. The planning system 168 may use this input to generate trajectories for the vehicle to follow for some brief period of time into the future based on a route generated by a routing module of the routing system 170. In this regard, the trajectories may define the specific characteristics of acceleration, deceleration, speed, etc. to allow the vehicle to follow the route towards reaching a destination. A control system software module of the computing devices 110 may be configured to control movement of the vehicle, for instance by controlling braking, acceleration and steering of the vehicle, in order to follow a trajectory.

The computing devices 110 may control the vehicle in an autonomous driving mode by controlling various components. For instance, by way of example, the computing devices 110 may navigate the vehicle to a destination location completely autonomously using data from the detailed map information and planning system 168. The computing devices 110 may use the positioning system 170 to determine the vehicle's location and perception system 174 to detect and respond to objects when needed to reach the location safely. Again, in order to do so, computing device 110 and/or planning system 168 may generate trajectories and cause the vehicle to follow these trajectories, for instance, by causing the vehicle to accelerate (e.g., by supplying fuel or other energy to the engine or power system 178 by acceleration system 162), decelerate (e.g., by decreasing the fuel supplied to the engine or power system 178, changing gears, and/or by applying brakes by deceleration system 160), change direction (e.g., by turning the front or rear wheels of vehicle 100 by steering system 164), and signal such changes (e.g., by lighting turn signals) using the signaling system 166. Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Figure 4:
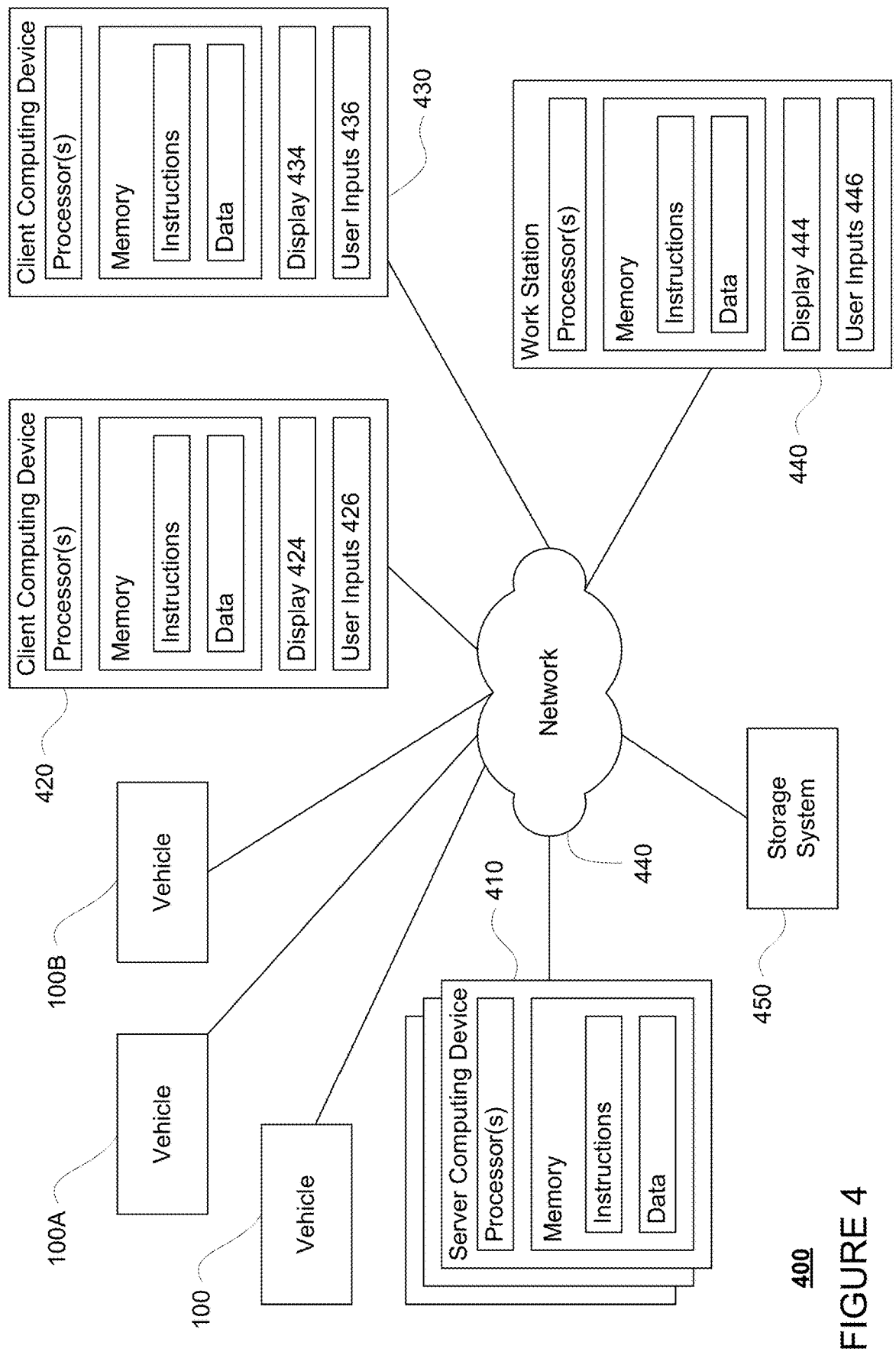
FIG. 4 is a functional diagram of the system of FIG. 4 in accordance with aspects of the disclosure.

Computing device 110 of vehicle 100 may also receive or transfer information to and from other computing devices, such as those computing devices that are a part of the transportation service as well as other computing devices. FIGS. 3 and 4 are pictorial and functional diagrams, respectively, of an example system 400 that includes a plurality of computing devices 410, 420, 430, 440 and a storage system 450 connected via a network 460. System 400 also includes vehicle 100A and vehicle 100B, which may be configured the same as or similarly to vehicle 100. Although only a few vehicles and computing devices are depicted for simplicity, a typical system may include significantly more.

As shown in FIG. 4, each of computing devices 410, 420, 430, 440 may include one or more processors, memory, data and instructions. Such processors, memories, data and instructions may be configured similarly to one or more processors 120, memory 130, data 132, and instructions 134 of computing device 110.

The network 460, and intervening graph nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of vehicle 100 or a similar computing device of vehicle 100A or vehicle 100B as well as computing devices 420, 430, 440 via the network 460. For example, vehicles 100, 100A, 100B, may be a part of a fleet of vehicles that can be dispatched by server computing devices to various locations. In this regard, the server computing devices 410 may function as a fleet management system which can be used to dispatch vehicles such as vehicles 100, 100A, 100B to different locations in order to pick up and drop off passengers. In addition, the computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 3, each client computing device 420, 430 may be a personal computing device intended for use by a user 422, 432 and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a wristwatch as shown in FIG. 3. As an example the user may input information using a small keyboard, a keypad, microphone, using visual signals with a camera, or a touch screen. As yet another example, client computing device 440 may be a desktop computing system including a keyboard, mouse, camera and other input devices.

Each of the client computing devices may be remote computing device used by a person (e.g. human operators or users 422, 432, 442) to review and analyze sensor data and other information generated by a perception system of a vehicle such as perception system 174 of vehicle 100. For example, user 442 may use the client computing device 440 to review visualizations generated as discussed herein. Although only a few remote computing devices are shown in FIGS. 3 and 4, any number of such work stations may be included in a typical system.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 3 and 4, and/or may be directly connected to or incorporated into any of the computing devices 110, 410, 420, 430, 440, etc.

Storage system 450 may store various types of information as described in more detail below. This information may be retrieved or otherwise accessed by a server computing device, such as one or more server computing devices 410, in order to perform some or all of the features described herein. For instance, the storage system may store sensor data, 3D content, a copy of the aforementioned roadgraph, camera models, camera calibration parameters, various matrices and/or values used to generate matrices, and other information discussed herein.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 8:
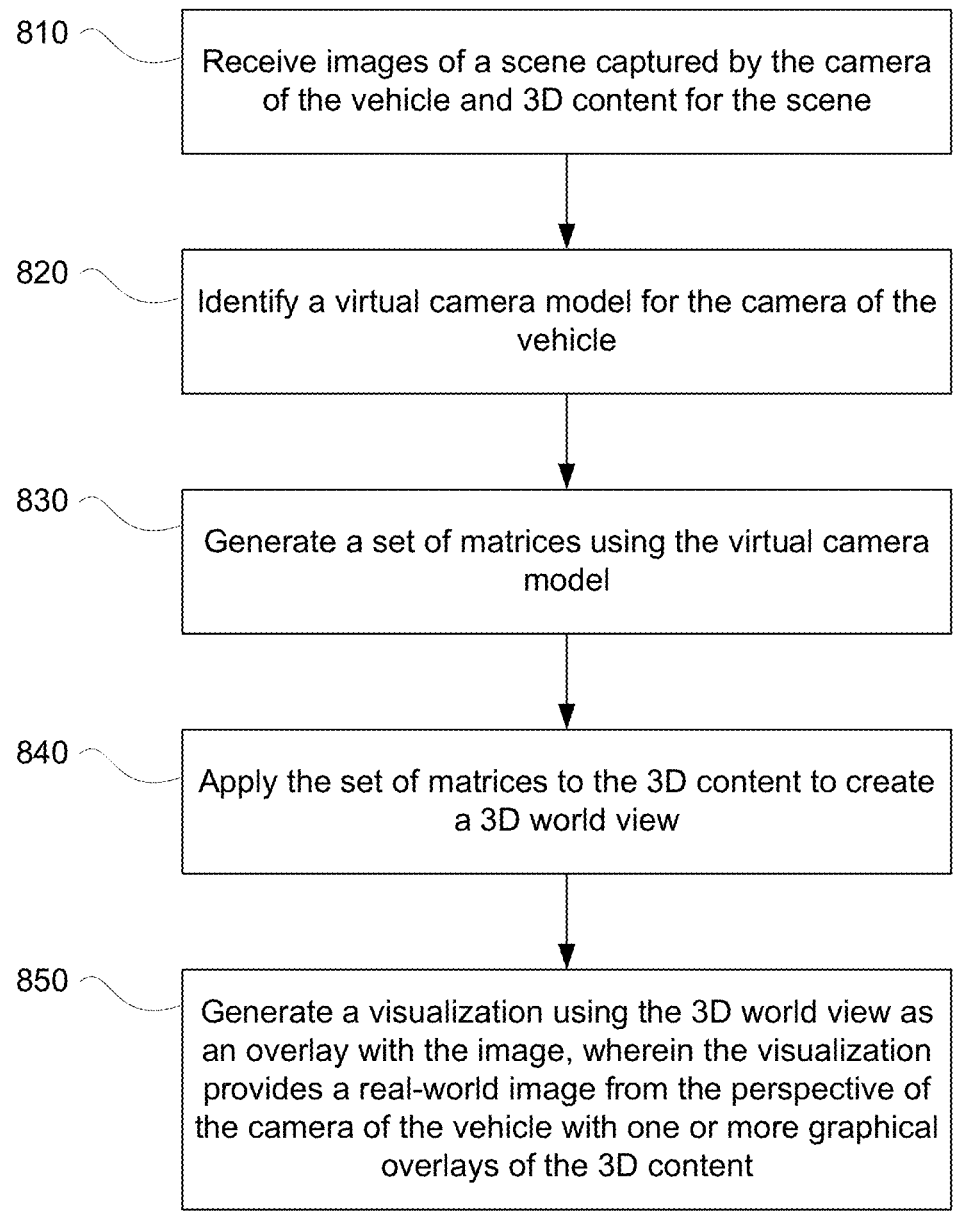
FIG. 8 is an example flow diagram in accordance with aspects of the disclosure.

FIG. 8 is an example flow diagram 800 for generating a visualization of a three-dimensional (3D) world view from a perspective of a camera of a vehicle, which may be performed by one or more processors of one or more computing devices, such as the processors of the server computing devices 410 or the processors of any of the client computing devices 420, 430, 440. At block 810, images of a scene captured by a camera of the vehicle and 3D content for the scene are received.

As noted above, as vehicle 100 drives through its environment, the one or more sensors of the vehicle's perception system 174 may record sensor data about the vehicle's environment. This sensor data may be stored in the memory of the computing devices 110. The perception system software module of the perception system 174 may also use the sensor data to detect and identify objects and their characteristics. For example the one or more sensors and/or the perception system 174 may generate 3D information. The 3D information may include, for example, 3D bounding boxes for objects, 3D LIDAR points or point clouds, 3D surfel maps, behavior prediction trajectories, information about trajectories of other objects, as well as other 3D labeled data. In this regard, the 3D information may be generated by or based on sensor data a combination of different types of sensors including, for example, LIDARs, sonar, radar, cameras, etc. The sensor data and the 3D information may be periodically uploaded to the server computing devices 450 or may be downloaded directly to the server computing devices (e.g. via a wired connection or using an intermediary hardware memory storage device). The information may then be stored by the server computing devices 410 in the storage system 450.

The 3D content for a scene may correspond to features of the roadgraph (e.g. lane markers, traffic light locations, non-drivable surfaces, shoulders on the road, lane boundaries/centers, street signs, railroad tracks, crosswalks, and other 3D information generated from data collected by other vehicles at the same or another point in time etc.) in proximity to the location where the vehicle is currently located (e.g. position and orientation) as well as all of the 3D information generated by the perception system of a vehicle within a particular period of time. This particular period of time may correspond to a refresh rate of a particular camera (e.g. the camera corresponding to the virtual model being used or any camera of the vehicle's perception system). In this regard, the images that are received may correspond to those captured during the particular period of time as well.

The sensor data may also be associated with calibration data for the sensors that captured the sensor data. For example, each time the vehicle is operated, the sensors of the perception system may need to be calibrated or the sensors may need to be periodically recalibrated. The calibration may involve determining or confirming calibration data including the extrinsic parameters of the sensor such as position and rotation of a camera relative to the vehicle, etc. The extrinsic parameters as well as the intrinsic parameters of the sensors may be associated with the sensor data, and as with the aforementioned sensor data and 3D information may be periodically uploaded to the server computing devices 450 or may be downloaded directly to the server computing devices (e.g. via a wired connection or using an intermediary hardware memory storage device). The information may then be stored by the server computing devices 410 in the storage system 450. Alternatively, the calibration data may be calculated by the server computing devices 410 from the sensor data and subsequently stored in the storage system 450 for later retrieval by the computing device 440.

In one instance, a human operator, such as user 442, may want to generate a visualization of a particular scene. The user 442 may use the client computing device 440 to request 3D content and images for a scene from the storage system 450 via the network 460. The 3D content and images may be received at the client computing device 440 and stored in local memory for further processing.

At block 820, a virtual camera model for the camera of the vehicle is identified. In order to generate the aforementioned renderings, a virtual camera model for each camera on a vehicle may be identified. The virtual camera model for a particular camera may identify the three-dimensional volume of space or the image space that that camera may capture. If a 3D point is projected into the image space, the 3D point will correspond to a point in the camera's virtual model. Thus, each virtual model may describe the intrinsic and extrinsic parameters of the camera, such as focal length, aperture size, position and rotation of the camera relative to the vehicle, etc. Many of the extrinsic values may be based on how each camera is calibrated on a particular vehicle and thus may be fixed values for each time the camera is calibrated. Thus, once a camera is recalibrated, these values may need to be updated and associated with the sensor data as described above. In this regard, the computing device 440 may retrieve the calibration data for a camera and the images captured by that camera from the storage system 450 and use the calibration data to generate the virtual camera model for that camera. Alternatively, the virtual camera model may be pre-computed by the server computing devices 410, stored in the storage system 450 and retrieved as needed by the computing device 440.

At block 830, a set of matrices using the virtual camera model is generated. The model for each camera may be used to generate a set of matrices for that camera. These matrices may be generated locally by the computing device 440 or may be computed by the server computing devices, stored in the storage system 450 and retrieved as needed by the computing device 440. As with the models, the matrixes may not be the same for each camera for each calibration, and thus may need to be redetermined if the cameras are recalibrated. The matrices may include a view matrix and a projection matrix.

The view matrix may be a matrix that transforms from world-space coordinates into camera-space coordinates. In this regard, the view matrix takes as input the coordinates of an object in the world, and as output provides the coordinates in the reference frame of a camera on the vehicle. The view matrix may be defined as a combination of a vehicle pose matrix $M_v$, a camera extrinsics matrix $M_e$, and a swap matrix $M_s$. In this regard, the view matrix may be defined as $M_v \times M_e \times M_s$.

The vehicle pose matrix $M_v$ may describe the current-time transformation of the vehicle for a scene (e.g. the vehicle's current rotation and position). The vehicle pose matrix $M_v$ may be obtained via onboard systems that track the vehicle's position in the world (e.g., vehicle sensors, GPS, accelerometers, etc.). In this regard, the vehicle pose matrix $M_v$ may be a standard 4 by 4 3D transformation matrix including translation and rotation. The camera extrinsics matrix $M_e$ may be the 3D transformation of the camera from the vehicle's origin (center), or the 3D rotation and 3D position of the camera, in matrix form. This camera extrinsics matrix $M_e$ may be obtained via camera calibration. In this regard, the camera extrinsics matrix $M_e$ may be a standard 4 by 4 3D transformation matrix including translation and rotation.

The swap matrix $M_s$ may perform a coordinate swap to transform from vehicle coordinates (e.g. an onboard vehicle-centric coordinate system) to 3D rendering coordinates such as OpenGL coordinates (e.g. coordinates more commonly used in 3D rendering). In this regard, the swap matrix $M_s$ may be considered a change of basis matrix.

The projection matrix may transform from 3D camera-space coordinates or rather coordinates in a reference frame of the camera into clip-space coordinates. Clip space may be a 2-unit wide cube, centered at (0, 0, 0), and with corners that range from (−1, −1, −1) to (1, 1, 1). Clip space may be compressed down into a 2D space and rasterized into an image. During rendering, the projection matrix is used to transform all visible coordinates into normalized device coordinate space (−1 to 1 in X, Y, and Z), and anything outside of that −1 to 1 cube is then discarded during rendering. This process may occur as part of the GPU rendering pipeline.

The projection matrix may be defined as a combination of a perspective projective transformation matrix $M_o$ and an orthographic projection matrix $M_p$. In this regard, the projection matrix may be defined as $M_o \times M_p$. The perspective projective transformation matrix $M_o$ may perform a perspective projection including a linear transformation of 3D data and distortion of points (e.g. using a pinhole projection model) as if such points were viewed from the perspective of the vehicle's camera. The orthographic projection matrix $M_p$ then converts the projected coordinates into clip space coordinates.

The perspective projective transformation matrix $M_o$ may be defined as shown below.

$$M_o = \begin{bmatrix} 1 & 0 & 0 & 0 \\ 0 & 1 & 0 & 0 \\ 0 & 0 & -\dfrac{2}{f-n} & -\dfrac{f+n}{f-n} \\ 0 & 0 & 0 & 1 \end{bmatrix}$$

In this example, f and n are the distances of the far and near planes used in clipping, respectively.

The orthographic projection matrix $M_p$ may be defined as shown below.

$$M_p = \begin{bmatrix} 2F_u & 0 & 2(C_u - 0.5) & 0 \\ 0 & 2F_v & 2(C_v - 0.5) & 0 \\ 0 & 0 & f+n & f*n \\ 0 & 0 & -1 & 0 \end{bmatrix}$$

In this example, $F_u$ and $F_v$ are the normalized focal lengths in the horizontal and vertical directions, respectively, from the camera's intrinsic values. These values may be obtained via calibration of the camera. In addition, $C_u$ and $C_v$ may be the normalized principal points in the horizontal and vertical directions, respectively, from the camera's intrinsic values. These values may be obtained via calibration of the camera.

At block 840, the set of matrices is applied to the 3D content to create a 3D world view. In other words, the processors of the client computing device 440 (or the processors of the server computing devices 410) may apply each of the view and projection matrices to the received 3D content. The results of the application of the view matrix and the projection matrix for each camera may be a virtual camera space within a 3D world view for the scene. In other words, the world view may incorporate all of the 3D information captured in a scene as well as features of the roadgraph into the virtual camera space for a camera even if it is outside of or beyond the 3D area of the virtual camera model. For example, the scene may represent all of the 3D information generated from sensor data captured by the perception system of a vehicle within the particular period of time.

At block 850, the visualization is generated using the 3D world view as an overlay with the image, wherein the visualization provides a real-world image from the perspective of the camera of the vehicle with one or more graphical overlays of the 3D content. The 3D world view may then be composited by the processors of the client computing device 440 (or the processors of the server computing devices 410) with the images captured by the camera to create a visualization of the 3D world view or rather, a 3D visualization of the scene. This may be achieved using alpha blending to give a graphical overlay of the 3D content with the camera images which may be displayed to an operator, such as user 442 on client computing device 440, from the perspective of a camera of the vehicle. In this regard, the visualization may include graphical overlays depicting features of the roadgraph (e.g. lane markers, traffic light locations, non-drivable surfaces, shoulders on the road, lane boundaries/centers, street signs, railroad tracks, crosswalks, and other 3D information generated from data collected by other vehicles at the same or another point in time etc.) in proximity to the location where the vehicle is currently located (e.g. position and orientation) as well as all of the 3D information generated by the perception system of a vehicle within a particular period of time such as the 3D bounding boxes for objects, 3D LIDAR points or point clouds, 3D surfel maps, behavior prediction trajectories, information about trajectories of other objects, as well as other 3D labeled data. In addition, these features may be performed at a GPU rather than a CPU reducing the resource drain on the CPU.

Figure 5:
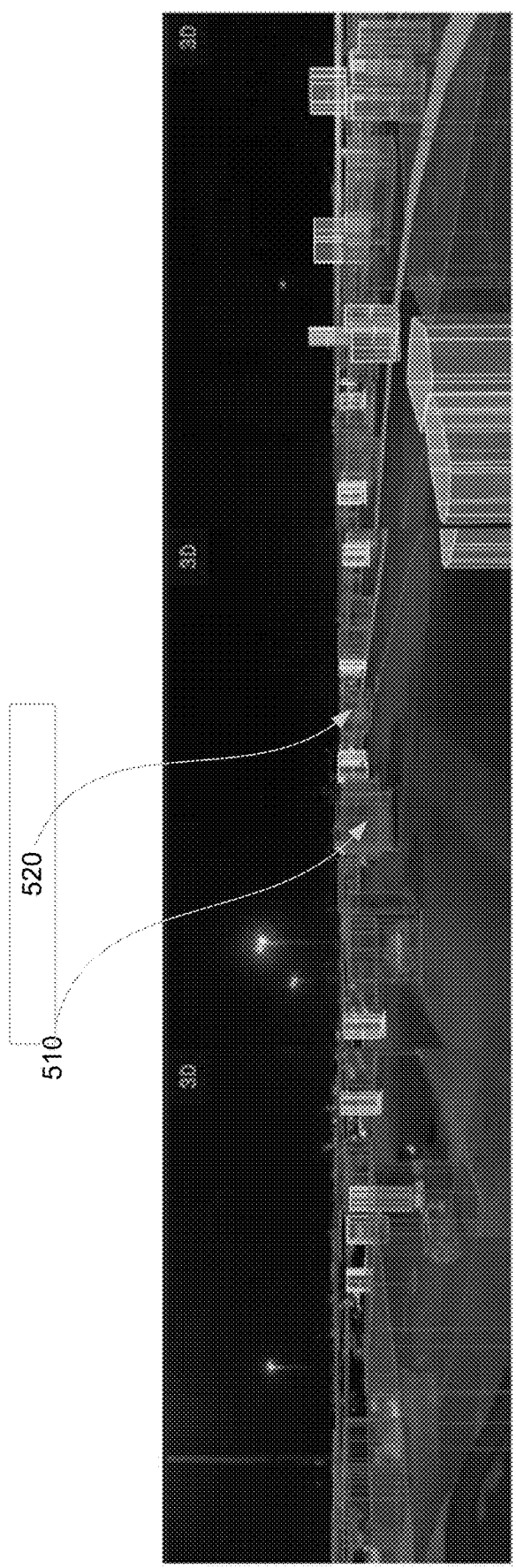
FIG. 5 is an example of a three-dimensional (3D) visualization in accordance with aspects of the disclosure.
Figure 6:
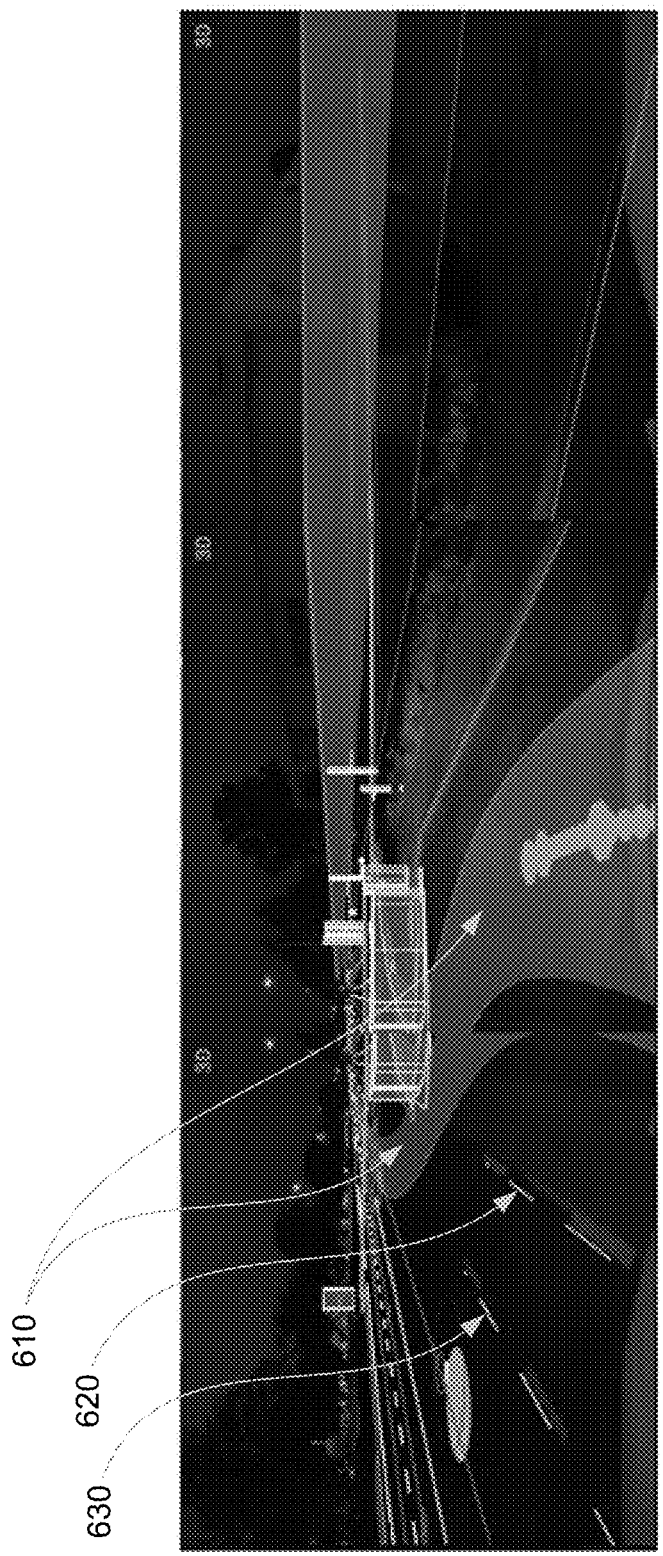
FIG. 6 is an example of a 3D visualization in accordance with aspects of the disclosure.
Figure 7:
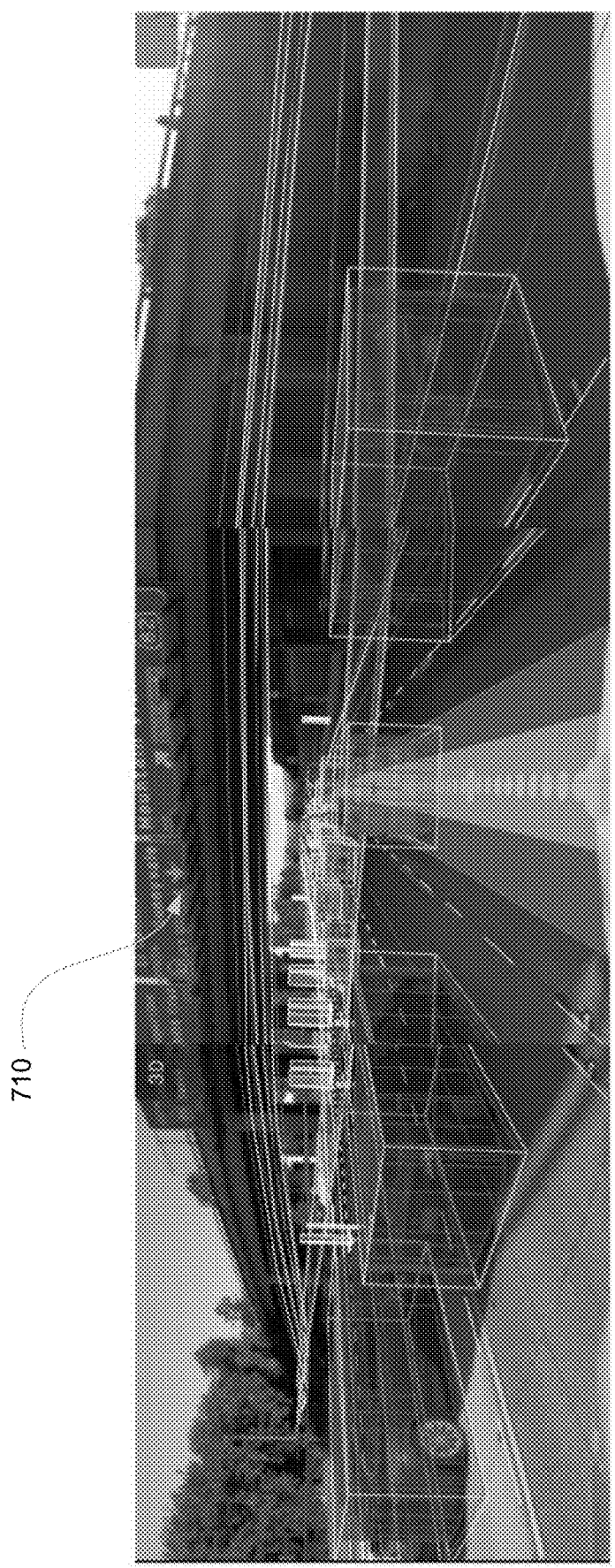
FIG. 7 is an example of a 3D visualization in accordance with aspects of the disclosure.

FIGS. 5, 6 and 7 provide examples of visualizations generating according to the aforementioned processes. Each of these Figures provides an example of a complex scene which may appear dramatically different from the perspective of the visualization or rather a camera of the vehicle as compared to a top-down view. Each of these examples depicts the graphical overlays of the aforementioned 3D content. In this regard, each of FIG. 5 provides an example of how objects in the vehicle's environment, represented by bounded boxes 510, 520, etc. can cause fairly large areas of occluded space. FIG. 6 provides an example of how 3D content, such as a trajectory 610 of the vehicle 100 as well as lane markers 620, 630, from the map information compares with features in the real world. As noted above, this may provide insights into whether the camera that captured the images in the visualization was well-calibrated. FIG. 7 provides an example of a complex scene which would be difficult to understand from a top-down perspective due to the overpass 710.

The aforementioned features may enable human operators to more readily identify certain issues, some of which may stem from improper sensor calibration. For example, if user 442 is using client computing device 440 to visualize 3D content for a scene where vehicle 100 is navigating a plurality of objects, with a typical top-down 3D view with camera images displayed at the same time, user 442 would need to mentally "work out" a mapping between the 3D objects in the top-down 3D view and the same objects in the camera image. Depending upon the complexity of the scene, this can be both time consuming and error prone. In other words, it can be especially difficult for scenes such as those on a highway with many other vehicles. However, when viewing the 3D world view overlayed with the camera images, the operator is able to visualize the 3D view from a camera of the vehicle. In this regard, the operator is able to directly visualize what objects the vehicle is detecting.

As another example, if the location of the features of the roadgraph or the roadgraph projection is above the road surface, this may be readily recognized in a side-perspective view, but may not be readily perceivable from a top-down view. In other words, while a typical bird's eye view is good for a high-level understanding of a scene, it can be difficult for a person's spatial recognition or to clearly understand the interactions between two objects as well as occlusions, especially where a camera can perceive something that a LIDAR sensor cannot.

Moreover, because the aforementioned steps can be performed locally (e.g. there is only one copy of the 3D content is needed at the GPU), rather than remotely at a server computing device, creating the 3D world view and overlaying with the camera images may be very performance efficient. In addition, because the aforementioned steps are all performed locally at a client computing device, a developer working on camera calibration or investigating camera calibration issues could interactively adjust the camera model (intrinsics/extrinsics) and view the results. This may be especially useful for debugging (e.g., poor/incorrect camera calibration.).

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific

The invention claimed is:

1. A method of generating a visualization of a three-dimensional (3D) world view from a perspective of a camera of a vehicle, the method comprising:
receiving, by one or more processors, images of a scene captured by the camera of the vehicle and 3D content for the scene;
identifying, by the one or more processors, a virtual camera model for the camera of the vehicle based on parameters associated with the camera of the vehicle;
generating, by the one or more processors, a set of matrices using the identified virtual camera model;
applying, by the one or more processors, the set of matrices to the 3D content to create the 3D world view; and
generating the visualization, by the one or more processors, using the 3D world view as an overlay with an image of the images, wherein the visualization provides a real-world image from the perspective of the camera of the vehicle with one or more graphical overlays of the 3D content.

2. The method of claim 1, wherein the parameters include intrinsic and extrinsic parameters of the camera of the vehicle.

3. The method of claim 2, wherein the parameters include focal length, aperture size, position and rotation of the camera relative to the vehicle when the images were captured.

4. The method of claim 1, wherein the set of matrices includes a view matrix.

5. The method of claim 4, wherein the view matrix transforms from world-space coordinates into camera-space coordinates.

6. The method of claim 4, wherein applying the set of matrices includes generating coordinates for the 3D content in a reference frame of the camera of the vehicle.

7. The method of claim 4, wherein the view matrix is defined as a combination of a swap matrix, a camera extrinsics matrix, and a vehicle pose matrix.

8. The method of claim 7, wherein the swap matrix is configured to perform a coordinate swap to transform from vehicle coordinates to 3D rendering coordinates.

9. The method of claim 7, wherein the camera extrinsics matrix provides a 3D position and 3D rotation of the camera of the vehicle when the image of the images was captured.

10. The method of claim 7, wherein the vehicle pose matrix provides rotation and position of the vehicle when the image of the images was captured.

11. The method of claim 1, wherein the set of matrices includes a projection matrix.

12. The method of claim 11, wherein the projection matrix is configured to transform 3D coordinates in a reference frame of the camera of the vehicle into clip-space coordinates.

13. The method of claim 11, wherein the projection matrix is defined as a combination of a transformation matrix and an orthographic projection matrix.

14. The method of claim 13, wherein the transformation matrix is configured to generate projected coordinates using a linear transformation of 3D content and distorting points from a perspective of the camera of the vehicle.

15. The method of claim 14, wherein the orthographic projection matrix is configured to convert the projected coordinates into clip space coordinates.

16. The method of claim 1, wherein the 3D world view incorporates 3D content from space outside of the identified virtual camera model.

17. The method of claim 1, wherein the 3D content includes 3D bounding boxes for objects.

18. The method of claim 1, wherein the 3D content includes one or more of 3D LIDAR points, 3D LIDAR point clouds, or 3D surfel maps.

19. The method of claim 1, wherein the 3D content includes features of a roadgraph.

20. The method of claim 1, wherein the 3D content includes behavior prediction trajectories for objects.

21. The method of claim 1, wherein the vehicle includes a plurality of cameras, the method further comprising:
identifying, by one or more processors, a virtual camera model for each camera of the plurality the cameras; and
generating, by the one or more processors, a set of matrices for each camera of the plurality of cameras of the vehicle using the virtual camera model for the camera.

22. The method of claim 1, wherein the set of matrices includes a view matrix that transforms from world-space coordinates into camera-space coordinates, the set of matrices including a projection matrix that transforms 3D coordinates in a reference frame of the camera of the vehicle.

23. A method of generating a visualization of a three-dimensional (3D) world view from a perspective of a camera of a vehicle, the method comprising:
receiving, by one or more processors, images of a scene captured by the camera of the vehicle and 3D content for the scene;
identifying, by the one or more processors, a virtual camera model for the camera;
generating, by the one or more processors, a set of matrices using the virtual camera model, wherein the set of matrices includes a view matrix that transforms from world-space coordinates into camera-space coordinates, the set of matrices including a projection matrix that transforms 3D coordinates in a reference frame of the camera of the vehicle;
applying, by the one or more processors, the set of matrices to the 3D content to create the 3D world view; and
generating the visualization, by the one or more processors, using the 3D world view as an overlay with an image of the images, wherein the visualization provides a real-world image from the perspective of the camera of the vehicle with one or more graphical overlays of the 3D content.

* * * * *